(No Model.)

M. HERRMANN.
MANUFACTURE OF HOLLOW GLASSWARE.

No. 246,312. Patented Aug. 30, 1881.

Witnesses:
J. M. Burnham
Daniel Breed

Inventor:
Max Herrmann
by C. S. Whitman,
atty.

UNITED STATES PATENT OFFICE.

MAX HERRMANN, OF DRESDEN, GERMANY, ASSIGNOR TO CHARLES WILLIAM SIEMENS, OF WESTMINSTER, ENGLAND.

MANUFACTURE OF HOLLOW GLASSWARE.

SPECIFICATION forming part of Letters Patent No. 246,312, dated August 30, 1881.

Application filed May 25, 1881. (No model.) Patented in Germany June 11, 1879.

*To all whom it may concern:*

Be it known that I, MAX HERRMANN, a subject of the Emperor of Germany, residing at Dresden, in the German Empire, have invented a new and useful Improvement in the Manufacture of Hollow Glassware, (for which I have obtained Letters Patent of the German Empire, No. 8,096, bearing date June 11, 1879,) of which the following is a specification.

My invention relates to the manufacture of hollow glassware and to molds for blowing bottles and other similar articles; and the nature thereof consists in the process of blowing an article of hollow glassware in a mold provided with openings which exert a planing or smoothing action upon the glass while either the glass or mold is being rotated.

It also consists in a mold for the manufacture of hollow glassware, provided with slits or openings for the egress of the fumes of the material used for lubricating the mold, and the ingress of air to cool the mold and the glass.

It also consists in certain novel combinations of parts and improvements in construction, hereinafter fully described.

Figure 2:
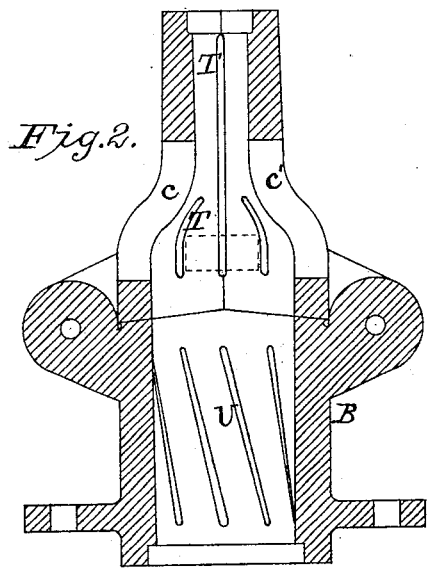
Figure 1:
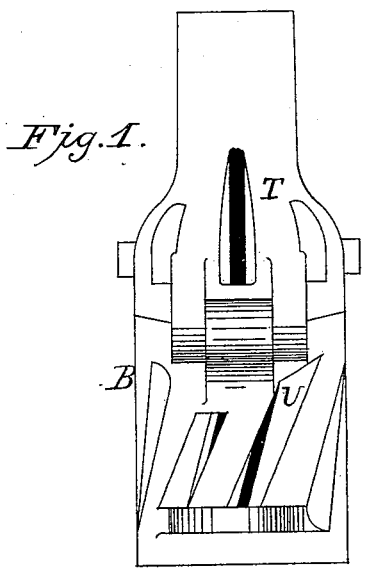
Figure 4:
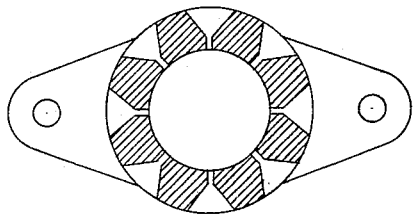
Figure 3:
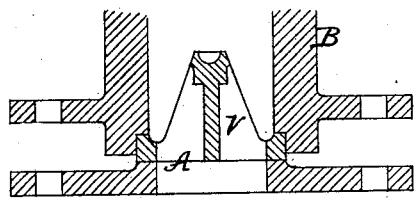
Figure 6:
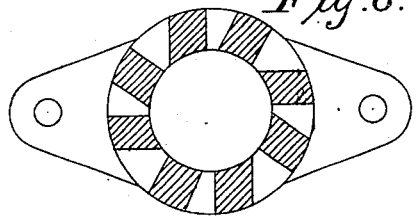
Figure 5:
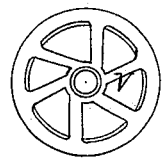

In the accompanying plate of drawings, Figure 1 is a side elevation of the mold. Fig. 2 is a vertical section thereof. Fig. 3 illustrates, in section, the bottom piece forming the pivot upon which the bottle is turned. Fig. 4 is a sectional plan of the body of the mold. Fig. 5 is a sectional plan, showing a modified form of the body of the mold.

Bottles and other articles cylindrical in form or circular in horizontal section are frequently constructed by rotating them while being blown in molds internally lubricated by oleaginous materials, and the walls of molds of this class have in some instances been provided with vent-holes or air-passages. These air-passages have been long in public use in the United States, and are described in several United States Patents. (See, for instance, United States Letters Patent No. 22,129, granted to John S. Mason, November 23, 1858.)

In the drawings, A designates the bottom piece, forming a pivot upon which the bottle is turned when in the mold, and having openings V, which permit the escape of the fumes or gases within the mold, and also admit air to cool the bottom of the glass and prevent the lower portion of the mold from becoming overheated.

B designates the cylindrical body of the mold, and C C' the folding parts, which may be opened and closed in the usual way.

The bottom A, cylindrical body B, and folding portions C C' are all made with openings V U T through them, giving free passage for access of air to cool the mold and the glass, also for egress of the fumes or gases proceeding from the carbonaceous or oleaginous material usually introduced for lubricating the mold, so that the bottle or article blown in it can be freely turned round therein while it is being blown. These openings through the mold are narrow at the inside of the mold and widen out considerably toward the outside, so that they readily clear themselves of any soot, ash, or other material entering them from the mold.

In the upper part of the mold the openings T may be in the form of vertical slits. In the vertical sides of the mold the openings U are in the form of slits cut obliquely, and in the bottom the openings V are of the form of segments separated by bars lying obliquely to the radii. In some cases, instead of turning the bottle or other article round in a stationary mold, the mold is caused to turn round, or partly round, while the article blown is held stationary. In the latter case molds with openings as above described are obviously applicable, the operation being the same whether they themselves or articles blown in them are caused to rotate. In blowing bottles which have recesses in their bottoms the center of the bottom of the mold forms a pivot on which the bottle turns, and when the recess has a projecting nipple a corresponding hollow is formed at the apex of the mold-bottom, the nipple in that case forming the pivot on which the bottle turns.

Skeleton-molds with openings through them, as above described, may either be made in a few parts, having the openings cut or cast through them, or they may be built up, in skeleton form, of bars or ribs with spaces between them, serving as the openings; but in all cases the slits U and openings V, or their equivalents, will better serve to plane or smooth the surface of the bottle when it is turned round in the mold, if their edges are set obliquely to the direction of the motion of the surface upon which they act.

I am aware that molds have been heretofore constructed with vents or air-passages to permit the air to escape, and that molds have been grooved longitudinally in the direction of the axis of rotation for the purpose of freeing the rotating surface from continuous contact with the mold.

I claim and desire to secure by Letters Patent of the United States—

1. The improvement in the art of manufacturing hollow blown glassware, which consists in blowing the same in a mold having openings at its sides and bottom for keeping the glass and mold cool, and to smooth and polish the surface of the glass.

2. In a mold for making hollow blown glassware, slits for the egress of gas or ingress of air, widened at their outer edges, so that they clear themselves of foreign matter.

3. In a mold for making hollow blown glassware, slits or openings having their edges set obliquely to the direction of motion of the surface upon which they act, as and for the purposes described.

4. The combination of the folding portions of the mold C C′, the cylindrical body B, and bottom piece, A, provided with openings V, as and for the purposes described.

MAX HERRMANN.

Witnesses:
RUDOLF LIEBIG,
LEIRO KLEMPERER.